United States Patent
Singh et al.

(10) Patent No.: US 7,974,620 B1
(45) Date of Patent: Jul. 5, 2011

(54) SELECTION OF ROAMING PARTNERS BASED ON LOAD VALUE

(75) Inventors: Anil Harishnankar Singh, Leawood, KS (US); Jason Peter Sigg, Olathe, KS (US); Ashish Bhan, Shawnee, KS (US); Maulik Shah, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 419 days.

(21) Appl. No.: 12/192,738

(22) Filed: Aug. 15, 2008

(51) Int. Cl.
*H04W 4/00* (2009.01)

(52) U.S. Cl. ............... 455/432.1; 455/435.2; 455/435.3; 455/434; 455/453

(58) Field of Classification Search ............... 455/432.1, 455/435.2, 435.3, 453
See application file for complete search history.

(56) References Cited

U.S. PATENT DOCUMENTS

| | | | | |
|---|---|---|---|---|
| 5,987,062 A * | 11/1999 | Engwer et al. | ................ | 375/225 |
| 6,580,700 B1 * | 6/2003 | Pinard et al. | ................. | 370/332 |
| 7,599,323 B2 * | 10/2009 | Chandranmenon et al. | .. | 370/328 |
| 2004/0120278 A1 * | 6/2004 | Krantz et al. | ................. | 370/328 |
| 2006/0293060 A1 * | 12/2006 | Yang et al. | ..................... | 455/453 |
| 2007/0232307 A1 * | 10/2007 | Ibrahim et al. | ................ | 455/436 |
| 2010/0056172 A1 * | 3/2010 | Iwamura et al. | .............. | 455/453 |

OTHER PUBLICATIONS

Related unpublished patent application entitled "Method and System for Data Rate Based Vertical Handoff," U.S. Appl. No. 11/091,229, filed Mar. 28, 2005.

* cited by examiner

*Primary Examiner* — Kent Chang
*Assistant Examiner* — Magdi Elhag

(57) ABSTRACT

A method, system, and media are provided for selecting a preferred roaming partner based on load conditions on an access networks associated with the selected preferred roaming partner. A wireless device storing one or more lists of preferred roaming partners is configured to receive configurations messages from the access networks associated with each of the preferred roaming partners. The wireless device parses the configurations messages and extracts load information from fields included the configuration messages. A load value of each preferred roaming partner is calculated based on the extracted load information. The wireless device selects the preferred roaming partner having the lowest load value to initiate wireless communication over the access network corresponding to the selected preferred roaming partner.

17 Claims, 4 Drawing Sheets

SELECTION OF ROAMING PARTNERS BASED ON LOAD VALUE

BACKGROUND

Conventionally, access terminals (ATs), such as wireless communication devices, are configured to operate on access networks provided by other carriers when the access terminal is outside the range of the access network for the access terminal's main carrier. The ATs "roam" on the access networks provided by the other carriers when wirelessly communicating with other ATs or communication devices. The loading of a sector of the access network associated with the other carriers increases as the number of access terminals connected to that sector increases. Generally, ATs connected to a sector with a high load will have a higher probability of degraded experience when wireless communicating over the loaded sectors of the access network. The ATs may experience reduced throughput during wireless communication or failed connection setups on when connected to a loaded sector of the access network.

When the AT connects to the main carrier, a router on the access network of the main carrier makes routing decisions to balance the load on the sectors of the access network. However, when the AT is roaming the main carrier is unable to balance the load because the main carrier is unaware of load conditions on other access networks associated with the other carriers.

SUMMARY

A high-level overview of embodiments of the invention is provided. Embodiments of the invention are defined by the claims below, not the high-level overview.

In a first embodiment, a set of computer-useable instructions provide a method for selecting a roaming partner from potential roaming partners for wireless communications. A wireless communication device executing the set of computer-usable instructions determines a load value for at least one of the potential roaming partners. The wireless communication devices determines which of the potential roaming partners has a lowest load value. When only one of the potential roaming partners has the lowest load value, then the wireless communication device selects the roaming partner having the lowest load value. If more than one of the potential roaming partners share the same lowest load value, then the wireless communication device selects the roaming partner having the highest priority from among the potential roaming partners that share the lowest load value.

In a second embodiment, one or more computer readable medium store computer-executable instructions that cause a processor to perform a method for selecting a roaming partner from potential roaming partners. The processor receives a message having a load field from each of the potential roaming partners. The processor determines the load value based on the load field for at least one of the potential roaming partners. The load values of the potential roaming partners are compared by the processor. The roaming partner from the potential roaming partners is selected based on a comparison of the load values of the potential roaming partners.

In a third embodiment a wireless communications device having a processor, a display coupled to the processor; and one or more computer readable medium coupled to the processor. The computer readable medium store one or more preferred roaming partner lists and computer-executable instructions for causing the processor to perform a method for selecting a roaming partner from the one or more preferred roaming partner lists. The processor receives a configuration message with two or more load fields for a specified number of the roaming partners on the preferred roaming partner list. In turn, the processor calculates a load value for the specified number of roaming partners based on the at least two load fields of the received configuration messages. The load values of the specified number of roaming partners are compared by the processor. The roaming partner from the preferred roaming partner lists is selected based on the comparison of the load values of the potential roaming partners.

BRIEF DESCRIPTION OF THE SEVERAL VIEWS OF THE FIGURES

Illustrative embodiments of the invention are described in detail below with reference to the attached drawing figures, which are incorporated by reference herein and wherein.

DETAILED DESCRIPTION

Figure 1:
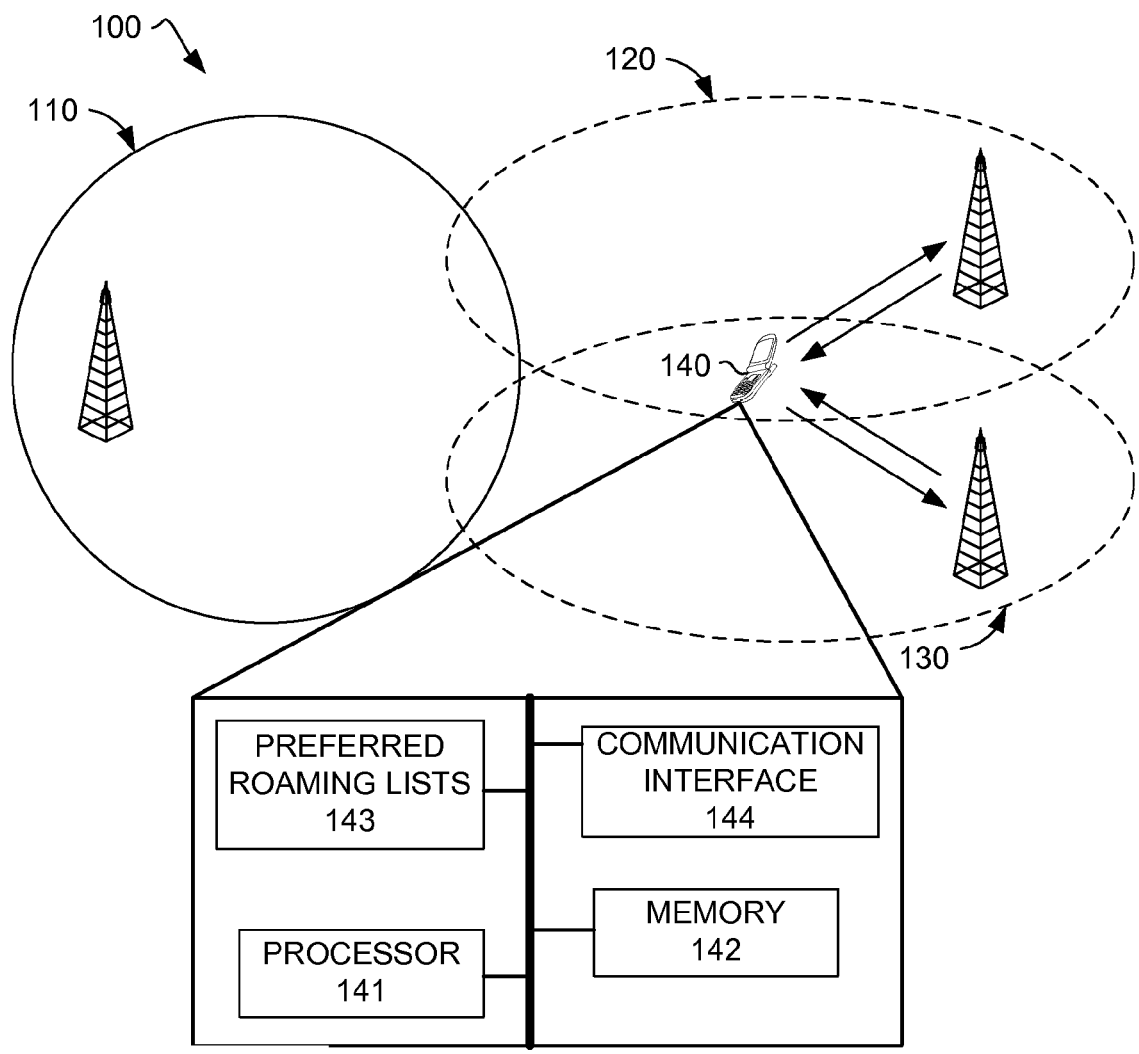
FIG. 1 depicts an exemplary environment for wireless communications in accordance with an embodiment of the invention.

Embodiments of the invention provide methods, computer readable media, and wireless communication devices that can select a roaming partner from among potential roaming partner based on certain criteria. A user may configure the wireless communication device to perform load value calculations when outside of the coverage area of a main carrier associated with the wireless communication device. The wireless communication device is configured to select a roaming partners based on current loading conditions for multiple roaming partners. The wireless communication device receives configuration message that include load information for the access networks associated with the roaming partners. The wireless communication devices are configured to execute a selection algorithm that scans the control channel for all preferred roaming partners based on a preferred roaming list (PRL) stored by the wireless communication device. In turn, the wirelesses communication devices identify a number of media access control addresses currently in use on the access networks associated with the preferred roaming partners. The wireless communication devices continuously monitor the number of media access control addresses currently in use and updates the load values based on the number of active media access control addresses. In some embodiments, the wireless communication devices establish a connection with access network associated with roaming partner having the smallest number of media access control addresses currently in use.

Wireless communication devices configured with the selection algorithm provide better wireless communication experiences because the probability of the wireless communication device being blocked or receiving lower throughput is lower on sectors of access networks associated with roaming partners that have fewer wireless communication devices as compared to sectors of an access network associated with roaming partners that are have more wireless communication devices.

Because the wireless communication device is aware of the existing loading conditions for the sectors of the access networks associated with each roaming partner, the wireless communication device is configured to access sectors of the access network associated with roaming partners having the smallest load values. Accessing the sectors with the smallest load value increases the wireless communication device's probability of successful wireless communication and assists in distributing the load across the access networks associated with the roaming partners.

Throughout the description of the invention, several acronyms and shorthand notations are used to aid the understanding of certain concepts pertaining to the associated system and services. These acronyms and shorthand notations are intended to help provide an easy methodology of describing the embodiments expressed herein and are not meant to limit the scope of the present invention. The following is a list of these acronyms:

AT Access Terminal
CDMA Code Division Multiple Access
EVDO Evolution-Data Optimized
FTC Forward Traffic Channel
MAC Media Access Control
PRL Preferred Roaming List
QC Quick Configuration Embodiments of the invention may be embodied as, among other things: a method, system, or computer-program product. Accordingly, the embodiments may take the form of a hardware embodiment, a software embodiment, or an embodiment combining software and hardware. In one embodiment, a selection algorithm for roaming partners is packaged as a computer-program product that includes computer-useable instructions embodied on one or more computer-readable media.

Computer-readable media include both volatile and nonvolatile media, removable and nonremovable media, and contemplates media readable by a database, a switch, and various other network devices, which are non-transitory in nature. By way of example, and not limitation, computer-readable media comprise media implemented in any method or technology for storing information. Examples of stored information include computer-useable instructions, data structures, program modules, and other data representations. Media examples include, but are not limited to, information-delivery media, random access memory, read only memory, programmable memory, flash memory or other memory technology, digital versatile discs, holographic media or other optical disc storage, magnetic cassettes, magnetic tape, magnetic disk storage, and other magnetic storage devices. These technologies can store data momentarily, temporarily, or permanently.

A wireless communication system includes, among other things, main communication partners, roaming partners, and wireless communication devices. The wireless communication devices connect to the main communication partners when within the coverage area of the main communication partners. When outside of the coverage area of the main communication partner, the wireless device is configured to select the roaming partner that will increase the probability of successful wireless communication.

FIG. 1 depicts an exemplary wireless communication system 100 for wireless communications in accordance with an embodiment of the invention. The wireless communication system 100 includes main communication partners 110, roaming partners 120 and 130, and wireless communication devices 140. In some embodiments, the wireless communication system 100 is an EVDO communication system.

The main communication partners 110 are base stations connected to the access network of a carrier that the wireless communication devices 140 are configured to access when the wireless communication devices are not roaming. The main communication partners 110 generate wireless communication channels to facilitate wireless communication with wireless communication devices 140 when the wireless communication devices 140 are within a coverage range. When the wireless communication devices 140 are outside of the coverage range, the main communication partners 110 are unable to provide wireless communication channels for the wireless communication devices 140.

The roaming partners 120 and 130 are base stations that are configured to provide wireless communication channels to the wireless communication devices 140 when the wireless communication devices 140 are outside of the coverage area associated with the main communication partners 110. The roaming partners 120 and 130 transmit control messages to the wireless communication device 110. In turn, the wireless communication devices 140 process the control messages to select an appropriate roaming partner 120 and 130. The roaming partners 120 and 130 allow the wireless communication devices 140 to connect to the access networks associated with the roaming partners 120 and 130. In some embodiments, the coverage area of the roaming partners 120 and 130 overlap.

The wireless communication devices 140 are mobile phones, personal digital assistants, or any mobile computing device that communicates wirelessly over an access network. The wireless communication devices 140 are configured to connect to the main communication partners 110 when within the coverage area of the main communication partners 110. Additionally, the wireless communication devices 140 are configured to connect to the roaming partners 120 and 130 when within the coverage area of the roaming partners 120 and 130 and outside of the coverage area of the main communication partner 110. The wireless communication devices 140 execute a roaming partner selection algorithm to select the roaming partner 120 or 130 associated with the highest probability of successful wireless communication. In certain embodiments, the wireless communication devices 140 include a processors 141, memories 152, preferred roaming partners 154, and communication interface 144 coupled to each other by a bus. The processors 141 are configured to execute the instructions associated with applications stored on the wireless communication devices. The memories 142 store data and instructions for applications and algorithms executed by the processors. The preferred roaming lists 144 store identifiers for the roaming partners that are available to the wireless communication devices 140. The communication interfaces 144 allow the wireless communication devices 140 to perform wireless communications with the access networks.

One of ordinary skill in the art understands and appreciates that wireless communication system 100 has been simplified. Alternate arrangements and configurations are available and within the scope and spirit of the Detailed Description; and the knowledge of one of ordinary skill in the art.

In an embodiment of the invention, the wireless communication devices are configured with selection algorithms for connecting to a roaming partner when the wireless communication devices are roaming. The selection algorithms executing on the wireless communication devices compares load values for multiple roaming partners. When two or more roaming partner have similar load values, the roaming partner with the highest priority is selected; otherwise, the roaming partner with the lowest load value is selected by the wireless communication devices.

Figure 2:
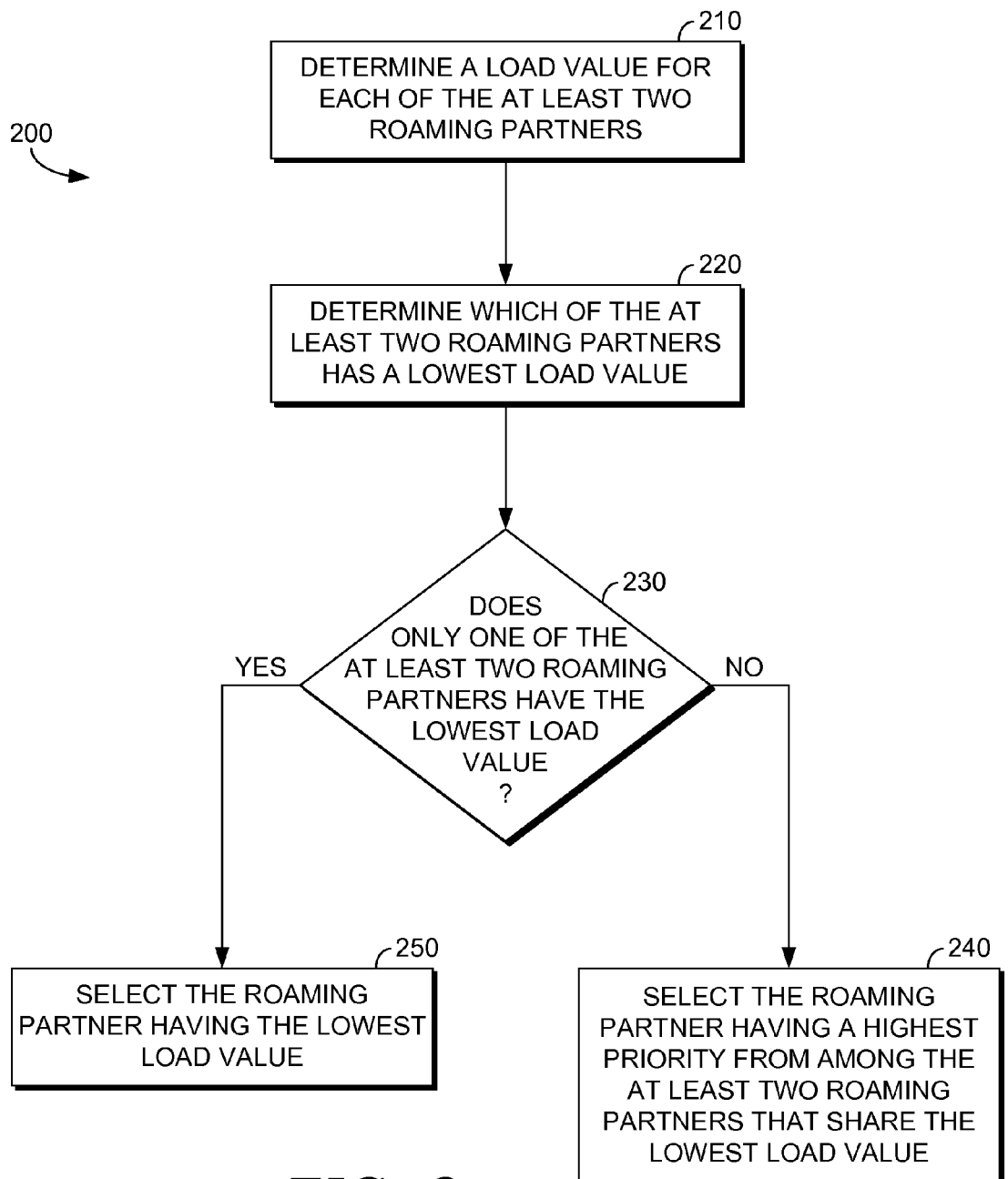
FIG. 2 depicts a flow diagram of a method for selecting a roaming partner from at least two potential roaming partners for wireless communications in accordance with an embodiment of the invention.

FIG. 2 depicts a flow diagram of a method 200 for selecting a roaming partner from at least two potential roaming partners for wireless communications in accordance with an embodiment of the invention. The method 200 initializes when the wireless communication device is outside of the coverage are of the main communication partner. In step 210, the wireless device determines a load value for each of, at least two, roaming partners associated with the wireless communication device. The wireless communication device determines which of the at least two roaming partners has the lowest load value, in step 220. In step 230, the wireless communication device determines whether two or more roaming partner have the same load value. When two or more roaming partners have the same load value, in step 240, the roaming partner with the highest priority is selected by the wireless communication devices to facilitate wireless communication. When only one roaming partner has the lowest load value, in step 250, that roaming partner is selected by the wireless communication devices to facilitate wireless communication.

In another embodiment, the wireless communication devices use control messages to calculate the load on access networks associated with preferred roaming partners included in a preferred roaming lists. The roaming partner having the lowest load value is selected by the wireless communication devices. In turn, the wireless communication devices initiate wireless communications with the selected roaming partner.

Figure 3:
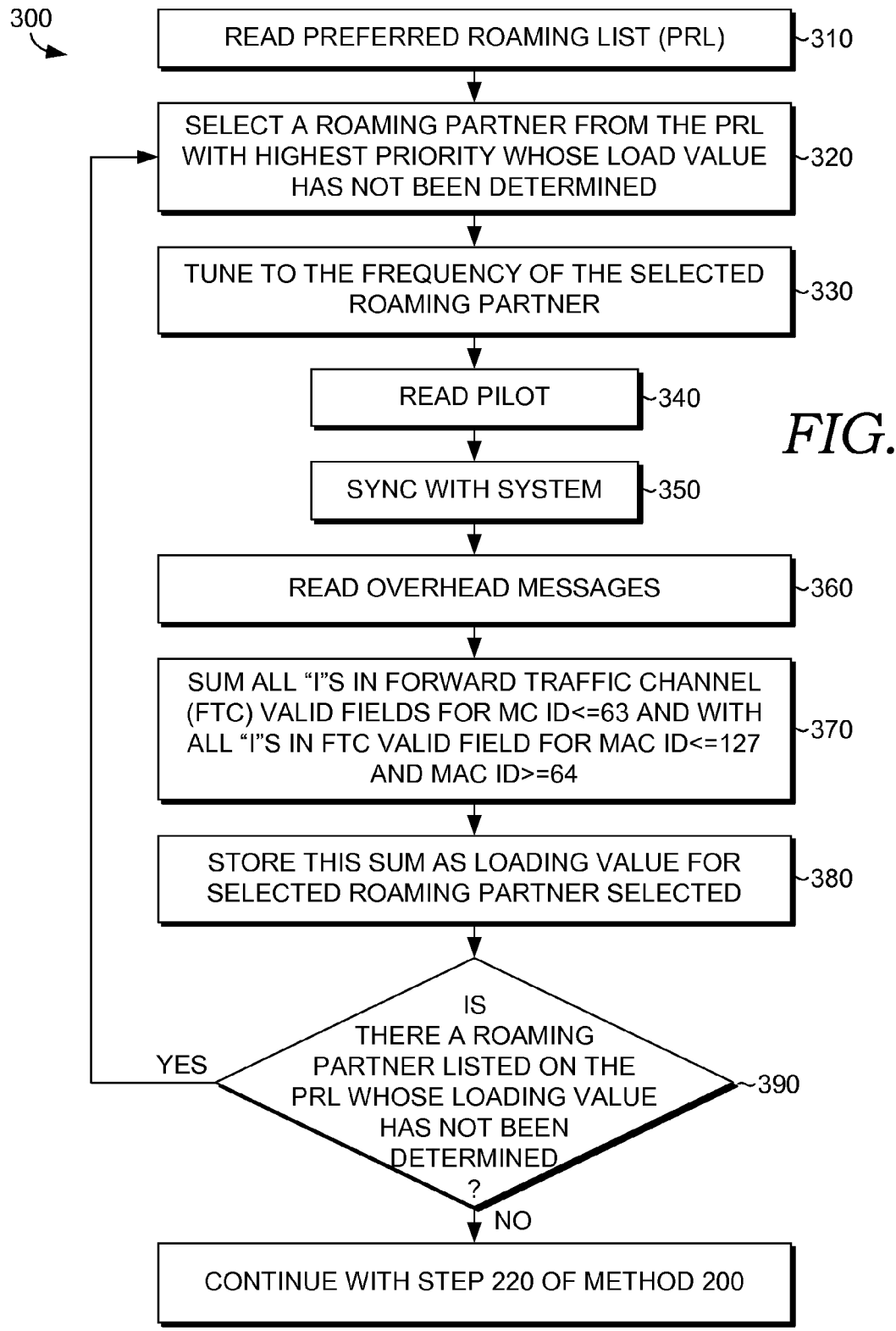
FIG. 3 depicts a flow diagram of another method for selecting a roaming partner from at least two potential roaming partners for wireless communications in accordance with a further embodiment of the invention.

FIG. 3 depicts a flow diagram of a method 300 for selecting a roaming partner from at least two potential roaming partners for wireless communications in accordance with a further embodiment of the invention.

In step 310, the wireless communication device reads the preferred roaming list having a plurality of roaming partners and corresponding priorities. In step 320, the wireless communication device selects the roaming partner having the highest priority and undetermined load value. In step 330, the wireless communication device tunes to the communication channel of the selected roaming partner. In turn, the pilot associated with the roaming partner is read, in step 340. In step 350, the wireless communication device synchronizes with access network associated with roaming partner. In step 360, the wireless communication device reads the overhead messages transmitted on the access network. The overhead messages contain configuration messages that include, among other things, information about other wireless communication devices connected to the access network of the selected roaming partner.

The configuration messages received by the wireless communication devices from the access networks include numerous fields. In an embodiment, the configuration message is a quick configuration message received over an EVDO access network. The quick configuration message is a control message that is broadcast at a high frequency compared to other overhead messages—sync message, SP message, and AP message—included in the control message cycles. The quick configuration message includes, among other things, RPC count fields, a forward traffic valid fields, and MAC index fields. The RPC count fields are set by the access network to provide an inclusive indication of the maximum number of channels and media access control addresses supported by the access networks. The MAC index fields provides a list of all the media access control addresses associated with access network. The forward traffic control (FTC) valid field provides a multi-bit control that indicates whether a corresponding media access control address is currently in use. Any combination of these fields may be utilized by the wireless communication device to calculate the load on the access networks associated with the roaming providers.

In step 370, MAC address fields included in the quick configuration message are read by the wireless communication device to sum each "1" included in the FTC valid field that corresponds to each MAC address. In step 380, the wireless communication device stores the sum as the load value of the roaming partner. In step 390, the wireless communication device repeats the above method 300 for each roaming partner with undetermined load values. When the load values for each roaming partner included in the preferred roaming list is available, the method may continue with method 200, which was illustrated in FIG. 2.

In some embodiment, the roaming partners are selected based on two or more fields included in the configuration message by the wireless communication device. The roaming partner with lowest load value is selected by the wireless communication device. In turn, the wireless communication device communicates over the access network corresponding to the selected roaming partner.

Figure 4:
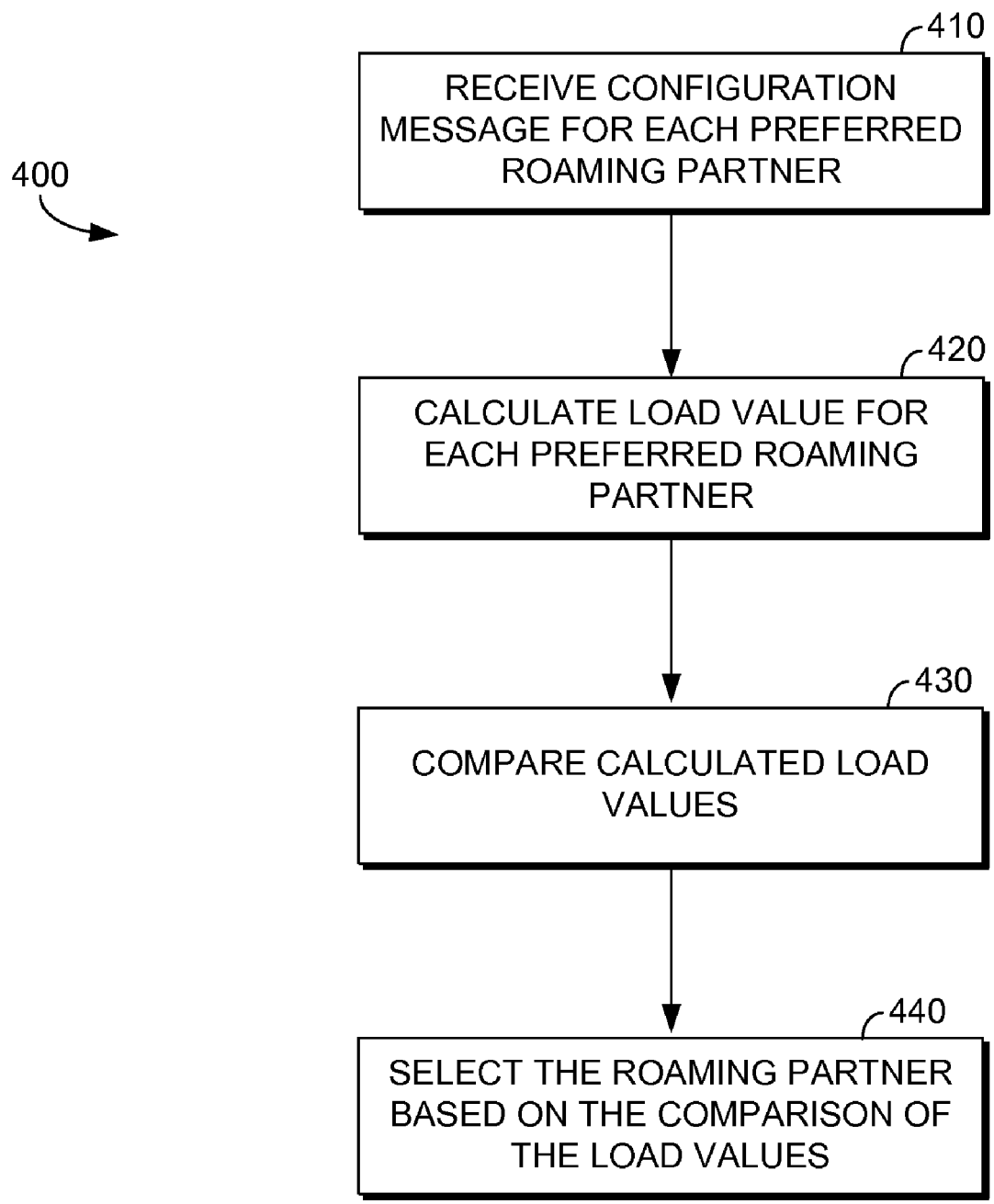
FIG. 4 depicts a flow diagram of a method for selecting a roaming partner in accordance with an embodiment of the invention.

FIG. 4 depicts a flow diagram of a method 400 for selecting a roaming partner in accordance with an embodiment of the invention.

In step 410, the wireless communication device receives configuration messages for each preferred roaming partner. In step 420, the wireless communication device calculates the load value for each preferred roaming partner. In step 430, the wireless communication device compares the calculated load values. In step 440, the roaming partner is selected by the wireless communication device based on the comparison. In an embodiment, the roaming partner with the lowest load value is selected.

In certain embodiments, the roaming provider selection algorithm executing on the wireless communication device is configurable based on user input. The user of the communication device may specify, at a user interface, a time period within which the wireless communication device must calculate the load values. Additionally, the user of the wireless communication device may configure the number of roaming partners that are considered when comparing load values. The user may also request that the wireless communication device communicate over the access network associated with roaming provide having the most recently used lowest load value. Moreover, the user may specify that the wireless device calculate the load value of the roaming partners based on an average or weighted average of the load on the access network rather than an instantaneous measurement of the current load on the access network.

Many different arrangements of the various components depicted, as well as components not shown, are possible without departing from the spirit and scope of embodiments of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of embodiments of the invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for selecting a roaming partner from potential roaming partners for wireless communications, comprising:
   determining, by a processor, a load value for at least one of the potential roaming partners, wherein determining a load value for each of the roaming partners further comprises:
      receiving a configuration message having a load field, the load field identifying one or more media access control (MAC) addresses in use for at least one of the potential roaming partners;
      summing a number of the one or more MAC addresses in use respectively for at least one of the potential roaming partners; and
      storing respective sums of MAC addresses in use as respective load values for at least one of the potential roaming partners;
   determining, by a processor, which of the potential roaming partners has a lowest load value;
   if only one of the potential roaming partners has the lowest load value, then selecting the roaming partner having the lowest load value; and
   if not, then selecting the roaming partner having a highest priority from among the potential roaming partners that share the lowest load value.

2. The method of claim 1, wherein the load value comprises a sum of MAC IDs in use for a potential roaming partner.

3. The method of claim 1, wherein the load value comprises an average of two or more sums of MAC IDs in use for a potential roaming partner.

4. The method of claim 1, wherein the potential roaming partners are based on a user-defined number and ranked by priority.

5. The method of claim 1, wherein determining a load value for at least one of the potential roaming partners further comprises averaging two or more sums of MAC addresses of a potential roaming partner during a user-defined time event.

6. The method of claim 1, wherein the method of the selecting the roaming partner occurs during a user-defined time event.

7. The method of claim 1, wherein the method occurs following one of an idle handoff and a call handoff.

8. A non-transitory computer readable medium having computer-executable instructions embodied thereon for causing a communications element to perform a method for selecting a roaming partner from potential roaming partners, the method comprising the steps of:
   receiving a message having a load field for each of the potential roaming partners;
   determining a load value based on the load field for at least one of the potential roaming partners, wherein determining a load value for each of the roaming partners further comprises:
      parsing the load field to identify one or more media access control (MAC) addresses in use for at least one of the potential roaming partners;
      summing a number of the one or more MAC addresses in use respectively for at least one of the potential roaming partners; and
      storing respective sums of MAC addresses in use as respective load values for at least one of the potential roaming partners;
   comparing the load values of the potential roaming partners; and
   selecting the roaming partner from the potential roaming partners based on the comparison of the load values of the potential roaming partners.

9. The computer readable medium of claim 8, wherein the step of selecting the roaming partner from the potential roaming partners based on a comparison of the load values of the potential roaming partners further comprises:
   if only one of the potential roaming partners has a lowest load value, then selecting the potential roaming partner having the lowest load value; and
   if two or more of the potential roaming partners share a lowest load value, then selecting the roaming partner, from among the two or more potential roaming partners that share a lowest load value, having the highest priority.

10. The computer readable medium of claim 8, wherein the computer readable medium is coupled to a timer.

11. The computer readable medium of claim 9, wherein the step of comparing the load values of the potential roaming partners further comprises:
   storing the respective load values of the potential roaming partners for each cycle;
   averaging the respective load values for each of the potential roaming partners per cycle; and
   determining which of the potential roaming partners have the lowest average load value.

12. A wireless communications device, comprising:
   a processor;
   a display coupled to the processor; and
   one or more computer readable medium coupled to the processor, the computer readable medium having one or more preferred roaming partner lists and computer-executable instructions embodied thereon for causing the processor to perform a method for selecting a roaming partner from the one or more preferred roaming partner lists, the method comprising the steps of:
   receiving a configuration message having at least two load fields for a specified number of the roaming partners on the preferred roaming partner list;
   calculating a load value for the specified number of roaming partners based on the at least two load fields of the received configuration message, wherein calculating a load value for the specified number of roaming partners further comprises:
      parsing the load field to identify one or more media access control (MAC) addresses in use for at least one of the potential roaming partners;
      summing a number of the one or more MAC addresses in use respectively for at least one of the potential roaming partners; and
      storing respective sums of MAC addresses in use as respective load values for at least one of the potential roaming partners;
   comparing the load values of the specified number of roaming partners; and
   selecting the roaming partner from the preferred roaming partner lists based on the comparison of the load values of the potential roaming partners.

13. The wireless communications device of claim 12 further comprising:
   initiating a communication session between the wireless device and the selected roaming partner.

14. The wireless communications device of claim 12 further comprising:
   configuring the wireless device to complete calculations of the load values with a specified time period.

15. The wireless communications device of claim 12 further comprising:
configuring the wireless device to perform calculations of the load values at a specified frequency.

16. The wireless communications device of claim 12, wherein the at least two load fields correspond to the maximum number of access terminals are configured to be connected to a preferred roaming partner's access network.

17. The wireless communications device of claim 12, wherein the at least two load fields correspond to a multi-bit field that indicates whether each media access control address associated with a preferred roaming partner's access network is currently in use by access terminals connected to the preferred roaming partner's access network.

* * * * *